Figure 1:
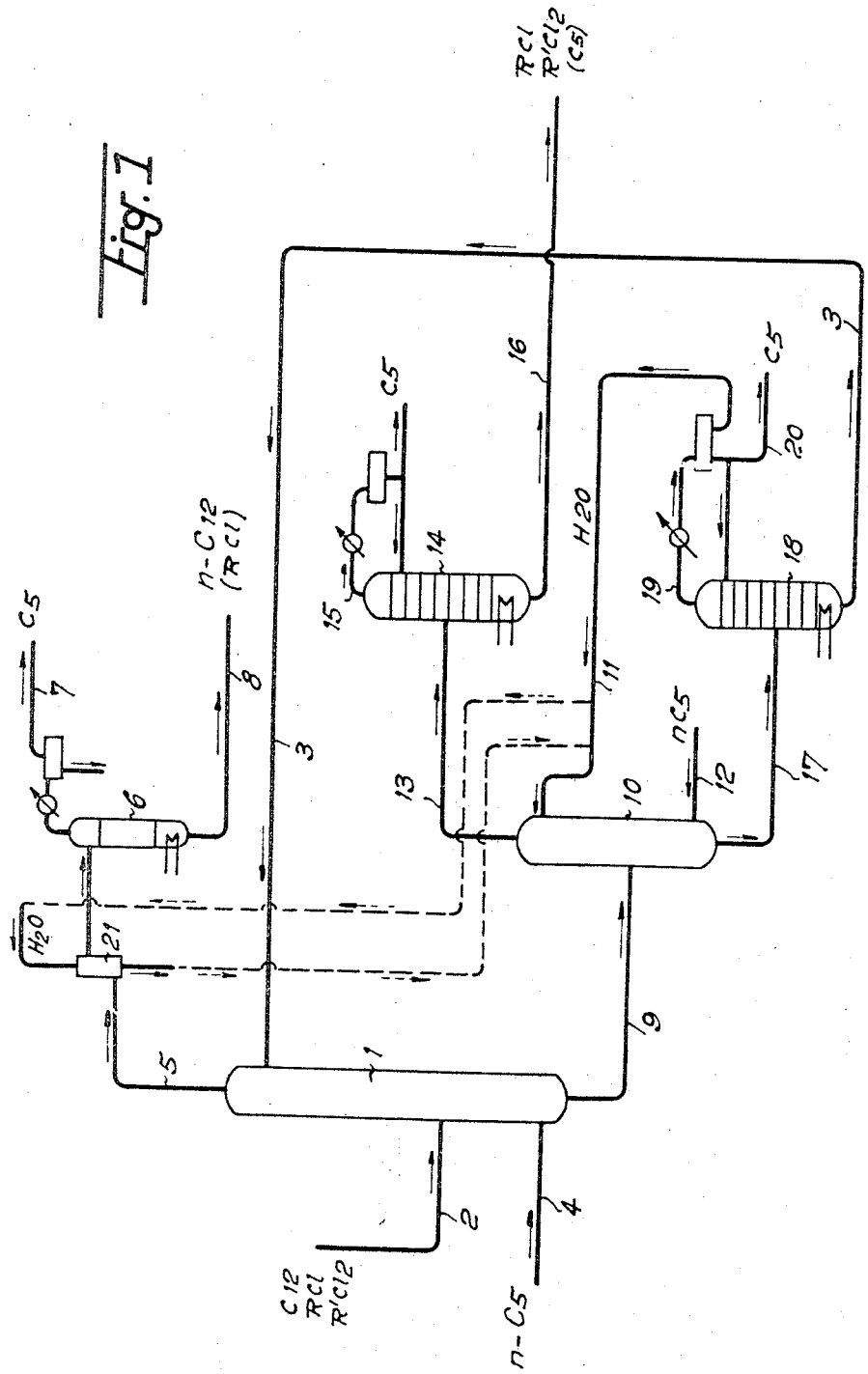

United States Patent Office 3,427,357
Patented Feb. 11, 1969

3,427,357
METHOD OF SEPARATING CHLORINATED HYDROCARBONS
Arnaud M. J. de Gramont, Gonfreville l'Orcher, Seine-Maritime, France; Philippe J. P. Maillot, 161 Rue Victor Hugo, Le Havre, Seine-Maritime, France; and Joseph Edouard Weisang, 15 Rue du Docteur Suriray, Le Havre, Seine-Maritime, France
Filed Aug. 26, 1965, Ser. No. 483,392
Claims priority, application France, Aug. 26, 1964, 986,267; Aug. 5, 1965, 27,391
U.S. Cl. 260—652  15 Claims
Int. Cl. C07c *17/38;* B01d *11/00*

This invention relates to a method of separating chlorinated hydrocarbons, starting from mixtures of hydrocarbons and their chlorinated derivatives, by means of a liquid-liquid extraction using suitable selective solvents. It is more particularly directed to the separation of chlorinated paraffinic hydrocarbons starting from mixtures of hydrocarbons and chlorinated paraffinic hydrocarbons.

Chlorinated paraffinic hydrocarbons are generally obtained by the action of free chlorine on the paraffins which occur, according to the degree of chlorination obtained, in fixing by substitution one or more atoms of halogen per molecule of hydrocarbon. When it is desired to prepare products only slightly chlorinated, for instance at the rate of 1 or 2 atoms of chlorine per molecule, the mass of hydrocarbon is only partly reacted, so that the chlorinated derivatives obtained remain mixed with untransformed hydrocarbons. It is often indispensable to be able to isolate the halogenated derivatives either with a view to their own proper application, or to be able to recycle the hydrocarbons which have not reacted into the chlorination phase. Now this separation is always found difficult both by distillation or by fractionated crystallization.

We have found that this separation may be effected by a liquid extraction using suitable selective solvents. In accordance with the present invention the liquid extraction is preferably effected using two solvents.

One a polar one, having a preferential affinity for the chlorinated constituents.

The other, a non-polar one, having a preferential affinity for paraffinic hydrocarbons.

We have found that extraction with a pair of polar-non-polar solvents is better than extraction with a single polar solvent. It makes it possible to dispense with the necessity of providing a reflux of extract, which extract would be difficult to obtain without alteration in the chlorinated products.

The choice of selective solvents is based on the consideration of the solubility parameters of the constituents, or families of constituents, to be extracted. The coefficient of division of the K chlorinated derivatives, for instance the RCl monochloride derivatives, between the polar solvent and the non-polar solvent is defined as the ratio of concentration in mols/1 of RCl in the two solvents $$K_{RCl} = \frac{(RCl) \text{ in polar solvent}}{(RCl) \text{ in non-polar solvent}}$$

Similarly the coefficient of division of the RH paraffinic hydrocarbons is expressed by the ratio $$K_{RH} = \frac{(RH) \text{ in polar solvent}}{(RH) \text{ in non-polar solvent}}$$

A coefficient B of selectivity for the chlorinated paraffinic hydrocarbons-paraffinic hydrocarbons separation is likewise defined by $$B = \frac{K_{RCl}}{K_{RH}}$$

Table 1 gives the K and B parameters measured at the ambient temperature for the pairs of solvents formed by one of the polar solvents listed and pentane as the non-polar solvent. The table refers to the type of separation of the n-dodecane-monochloro-n-dodecane mixture. The polar solvents used are saturated with non-polar solvent (pentane) and vice versa. Their reciprocal solubilities also appear in Table 1.

TABLE 1

| Pair of solvents | $K_{RCl}$ | $K_{RH}$ | B | Solubility, percent by weight | |
|---|---|---|---|---|---|
| | | | | Solvent in $C_5$ saturated with solvent | $C_5$ in solvent saturated with $C_5$ |
| Acetonitrile-pentane | 0.109 | 0.0315 | 3.45 | 6.9 | 15.7 |
| Monomethylether of ethylene glycol-pentane | 0.201 | 0.081 | 2.49 | 2.8 | 17.0 |
| Monomethylether of diethylene glycol-pentane | 0.155 | 0.049 | 3.15 | 4.0 | 11.9 |
| Dimethyl formamide-pentane | 0.266 | 0.053 | 5.0 | 3.0 | 16.0 |
| Alcohol tetrahydrofurfuryl (+2% water)-pentane | 0.323 | 0.108 | 2.99 | 6.4 | 13.8 |
| Acetonyl acetone-pentane | 0.230 | 0.0565 | 4.07 | 7.0 | 13.7 |

Generally speaking solvents suitable for the extraction satisfy the following conditions:

$$B \geqslant 1.7$$
$$0.414 \log B - \log K_{RCl} \leqslant 1.18$$

The solvents thus selected give good results with a column of at least 25 theoretical plates and having a ratio of polar solvent to non-polar solvent below 15.

It has also been found that the miscibility of the two solvents should not be too great; the solubility of one of the solvents in the other should not in any case exceed 50% by weight. A certain degree of solubility of the non-polar solvent in the polar solvent may be tolerated, and it has even been found that it may act beneficially when it was between 5 and 20% by weight. On the other hand the solubility of the polar solvent in the non-polar solvent should be as slight as possible.

Finally it is advantageous if the polar solvent has good solubility in water, which will permit its subsequent recovery.

In accordance with the present invention the polar solvents which are particularly advantageous for the extraction of chlorinated derivatives of paraffinic hydrocarbons are cyclic alcohols such as tetrahydrofurfurylic alcohol, glycol ethers, such as the monomethylic ether of ethylene glycol and the monomethylic ether of diethylene glycol, acetonyl acetone, solvents with a nitrated function such as acetonitrile and dimethyl formamide. It is also possible to use acetone and N-methyl pyrrolidone.

This list is not in any way restrictive and numerous other polar solvents may also be used.

There may be mentioned for instance benzylic alcohol, phenylethylic alcohol, the monoethylic ethers of ethylene glycol and of diethylene glycol, methylic and ethylic ethers of propylene glycol and of dipropylene glycol, acetyl acetone, propyonitrile, ethyl monoethanolamine, ethyl diethanolamine, morpholine, diethyl formamide, monoethyl formamide, monophenyl formamide, acetic, propionic, chloracetic acids, phenol, sulphurous anhydride, epichlorohydrine, and dimethyl sulpholane.

The polar solvent is most frequently used in the anhydrous state, but there may be no disadvantage and it may even be advantageous if it contains small quantities of water, without however exceeding 10% by weight.

The non-polar solvents suitable for the process of extraction in accordance with the invention are saturated aliphatic hydrocarbons, preferably those paraffinic hydrocarbons having a boiling point sufficiently below that of the paraffin to be separated, to facilitate the subsequent elimination of the non-polar solvent by distillation. It is advisable to select hydrocarbons with 3 to 8 atoms of carbon.

The extraction is carried out at a temperature not exceeding 60° C. Provided that the products used are liquid in the extraction conditions, it is preferable to operate at the ambient temperature.

Extraction gives on the one hand a raffinate containing non-chlorinated paraffinic hydrocarbons with small quantities, varying according to the operational conditions of extraction, of chlorinated product. These conditions are selected so that the quantities shall be as small as possible, keeping economic conditions in mind. In accordance with the invention the raffinate is washed with water to free it from solvent, then it is stripped or a flash distillation is made to recover the non-polar solvent (generally a small quantity) and the non-chlorinated paraffinic hydrocarbon, including the small quantities of entrained chlorinated products, which can then be returned for chlorination if so desired.

Extraction further supplies an extract containing extracted chlorinated derivatives, the polar solvent, a considerable fraction of non-polar solvent and small quantities of non-chlorinated paraffinic hydrocarbon.

A feature of the invention consists of treating the extract phase in a second extraction utilizing an accessory pair of solvents one of which is water dissolving the polar solvent of the first extraction and the other of which is a non-polar solvent, preferably the same as that of the first extraction and dissolving the chlorinated derivatives. This second extraction therefore gives on the one hand the chlorinated derivatives in the non-polar solvent, and on the other hand an aqueous solution of solvents consisting for the most part of the polar solvent. This second extraction is completed by distillation in appropriate towers of the second phase of the raffinate and of the second phase of the extract, products being withdrawn, and solvents recycled in extraction columns.

An apparatus for applying the invention is represented by way of example in FIGURE 1 of the attached drawings.

For simplicity of description it is supposed that the polar solvent is dimethyl formamide and the non-polar solvent is normal pentane, but of course other pairs of solvents could be selected.

The mixture to be separated consisting for instance of the product of chlorination of n-dodecane (about 30%) and of untransformed dodecane (about 70%) is fed into the extraction column 1 through the duct 2. Through the duct 3 is fed the polar solvent (dimethyl formamide) and at the other end of the column 1 is introduced through the duct 4 the non-polar solvent (normal pentane). The extraction column is a column of any known type, such as a filling type column, a plate type column, or a column of the type with rotating discs. A mixture emerges from the upper part of the column through the duct 5, containing almost all the dodecane of the charge with small quantities of pentane, dimethyl formamide and chlorinated derivative. After one washing with water at 21 to eliminate the dimethyl formamide, this mixture is returned into a stripper 6 where thanks to the introduction of vapour at the base, the pentane is separated at 7 and the dodecane at 8 with a little of unseparated chlorinated derivative. The product flowing through the duct 8 is returned without difficulty for chlorination.

At the bottom of the column 1 there is extracted through the duct 9 an extract containing extracted chlorinated derivatives, dimethyl formamide, the major part of the pentane, and small quantities of dodecane. This extract is treated in the second extraction column 10 in which water is introduced at the top through the duct 11 and pentane at the bottom through the duct 12. It is economic to use here the water which has already served for washing the raffinate 21 and which contains small quantities of dimethyl formamide which is thus regenerated. The washer 21 can be placed in line, in the line 11. At the head of the column the chlorinated derivatives are withdrawn mixed with pentane. These are fed through the duct 13 into a distillation tower 14 which separates pentane at the head of the tower 15 and the chlorinated derivatives at the bottom of the tower 16. It is thus possible without inconvenience not to separate all the pentane, and to leave a certain quantity in the chlorinated derivatives. It is even advantageous to operate in this manner if it is intended to feed the chlorinated derivatives into a dehydrochlorination installation. All the dimethyl formamide with water and traces of pentane is withdrawn through the duct 17 from the bottom of the extraction column 10. The dimethyl formamide is dehydrated in the distillation tower 18. It is withdrawn at the bottom and returned through the duct 3 into the extraction column 1. Water and pentane leave at the head 19 of the column 18 and they are separated by decantation. The water is returned through the duct 11 to the column 10 and to the washing position 21. The different effluents of pentane 20, 15 and 7 are collected in one and the same storage tank (not shown) for reutilization in the extraction columns 1 and 10.

The method of extraction of chlorinated derivatives which has just been described may be advantageously employed, either for the obtaining of chlorinated derivatives themselves, or for obtaining charges which are directly usable for the alkylation of aromatic hydrocarbons in the presence of catalysts such as $AlCl_3$ or finally for obtaining olefins by dehydrochlorination of the chlorinated derivatives.

An important variant of the invention also consists of isolating the polyhalogenated derivatives of monohalogenated derivatives: either directly by one single extraction starting from the crude product of the chlorination, or by re-extraction of a mixture containing altogether the mono- and poly-halogenate derivatives coming from a first extraction of the halogenated derivatives.

EXAMPLE 1

There are fed into the extraction column 1 with an approximate theoretical effectiveness of 11 plates, a current of 10,000 kg. per hour of a mixture coming from an installation for chlorination of paraffinic hydrocarbons containing 2.8 kg. of monochlorinated n-dodecane, 0.35 kg. of dichlorinated n-dodecane and 6.83 kg. of untransformed dodecane. The column 1 is fed at the head through the duct 3 with a current of 92.30 kg. per hour of dimethyl formamide and at the bottom through the duct 4 with a current of 13.12 kg. per hour of n-pentane.

Through the duct 5 there are extracted 7.37 kg. per hour of raffinate which is freed by washing with water of 0.16 kg. of dimethyl formamide and which is fed into the stripper 6 to eliminate at 7, −0.01 kg. per hour of n-pentane and at 8 there is collected 7.20 kg. per hour of a mixture which is returned direct for chlorination consisting of 6.78 kg. of n-$C_{12}$ and 0.42 kg. only of chlorinated derivative.

There is likewise discharged at 9, 108.05 kg. per hour of extract which is fed into the second extraction column 10, this column receiving at 11 3.03 kg. per hour of water to which there is added 0.16 kg. of dimethyl formamide regenerated by washing and, at 12, 35.00 kg. per hour of n-pentane.

The secondary raffinate discharging at 13 is fractionated in the tower 14 from which there is collected, at the head, 37.50 kg. of pentane, and at the bottom a mixture containing the chlorinated derivatives, that is to say 2.40 kg. of mono-, 0.35 kg. of di- with 0.05 kg. of n-$C_{12}$ and 6.31 kg. of n-$C_5$. This mixture is directly available for feeding to the dehydrochlorination installation in order to obtain olefin-the dodecene.

The secondary extract discharging at 17 is fractionated in the tower 18. Water and pentane are chased away at the head. Through the duct 11, 3.03 kg. of water are returned into the column 10 and the washing point 21 and there is discharged at 20, 4.30 kg. of n-$C_5$. Finally there is extracted from the bottom of the tower 18 the anhydrous polar solvent: 92.30 kg. of dimethyl formamide, which is returned through 3 to the column 1.

EXAMPLE 2

Using a column of 11 theoretical plates an industrial charge is treated which is obtained in the following fashion. A practically pure fraction of n-paraffinic hydrocarbons obtained by extraction with molecular sieves, and with the following composition:

n-$C_{10}$: 12.1%; n-$C_{11}$: 40.3%; n-$C_{12}$: 28.0%; n-$C_{13}$: 19.6%. (Composition by weight.)

This fraction is chlorinated by gaseous chlorine and the following composition is obtained:

| | Percent by weight |
|---|---|
| Chlorinated paraffinic hydrocarbons | 27.5 |
| Untransformed paraffinic hydrocarbons | 72.5 |

The column is then fed with the following flows of reagents:

| | Kg. per hour |
|---|---|
| Charge to be treated | 22.9 |
| Chlorinated paraffinic hydrocarbons | 6.3 |
| Untransformed paraffinic hydrocarbons | 16.6 |
| Tetrahydrofurfuryl alcohol (containing 2% water) | 202.0 |
| n-Pentane | 30.9 |

The rates of flow of raffinate and extract obtained are as follows:

(1)

| | Kg. per hour |
|---|---|
| Total raffinate | 10.7 |
| Tetrahydrofurfuryl alcohol | 0.1 |
| n-Pentane | 0.1 |
| Paraffinic hydrocarbon | 9.3 |
| Chlorinated paraffinic hydrocarbon | 0.6 |

(2)

| | Kg. per hour |
|---|---|
| Total extract | 245.1 |
| Tetrahydrofurfuryl alcohol | 201.3 |
| n-Pentane | 30.8 |
| Paraffinic hydrocarbon | 7.3 |
| Chlorinated paraffinic hydrocarbon | 5.7 |

Treatment of the raffinate

Washing with water by about 10 kg. per hour of $H_2O$. Flash distillation of pentane. There is obtained:

| | Kg. per hour |
|---|---|
| Paraffinic hydrocarbon | 9.3 |
| Chlorinated paraffinic hydrocarbon | 0.6 |

The raffinate to be recycled for chlorination contains therefore substantially 6% of chlorinated products.

Treatment of the extract

Extraction over the column 10 with

| | Kg. per hour |
|---|---|
| $H_2O$ | [1] 37.0 |
| n-Pentane | 80.0 |

[1] Containing 0.7 kg. per hour of tetrahydrofurfurylic alcohol coming from the washing of the raffinate.

A new raffinate (113.2 kg. per hour) is obtained from which there is completely distillated the pentane and there is recovered:

| | Kg. per hour |
|---|---|
| Paraffinic hydrocarbon | 7.3 |
| Chlorinated paraffinic hydrocarbon | 5.7 |

This product with 43.8% by weight of chlorinated derivative may be used for the alkylation of benzene by $AlCl_3$.

At the bottom of the tower there is collected a mixture which after distillation gives:

| | Kg. per hour |
|---|---|
| $H_2O$ | 36.3 |
| n-$C_5$ | 10.6 |
| Tetrahydrofurfuryl alcohol | 202.0 |

EXAMPLE 3

This example illustrates the extraction of dichlorinated derivatives.

The apparatus, the charge and the solvents are as in Example 1. But the column is fed with 95.30 kg. per hour of dimethyl formamide and 18.00 kg. per hour of n-pentane and 10 kg. per hour of chlorinated dodecane. 12.2 kg. per hour of raffinate is collected which is washed with water and then stripped of 2.24 kg. per hour of n-pentane. The product obtained corresponds, after analysis, to flows of

| | Kg. per hour |
|---|---|
| Dodecane | 6.79 |
| Monochlorinated dodecane | 2.63 |
| Dichlorinated dodecane | 0.04 | i.e., it is almost free of dichlorinated products.

The extract (111.10 kg. per hour) is treated under conditions substantially identical with those described in Example 1 and there are finally obtained chlorinated products freed from pentane with a rate of flow of 0.54 kg. per hour and a composition as follows:

| | Percent by weight |
|---|---|
| Dodecane | 7.4 |
| Monochlorinated dodecane | 35.2 |
| Dichlorinated dodecane | 57.4 |

It will be seen therefore that by changing the proportion of extraction solvents it is possible to extract the dichlorinated products formed selectively.

Figure 2:
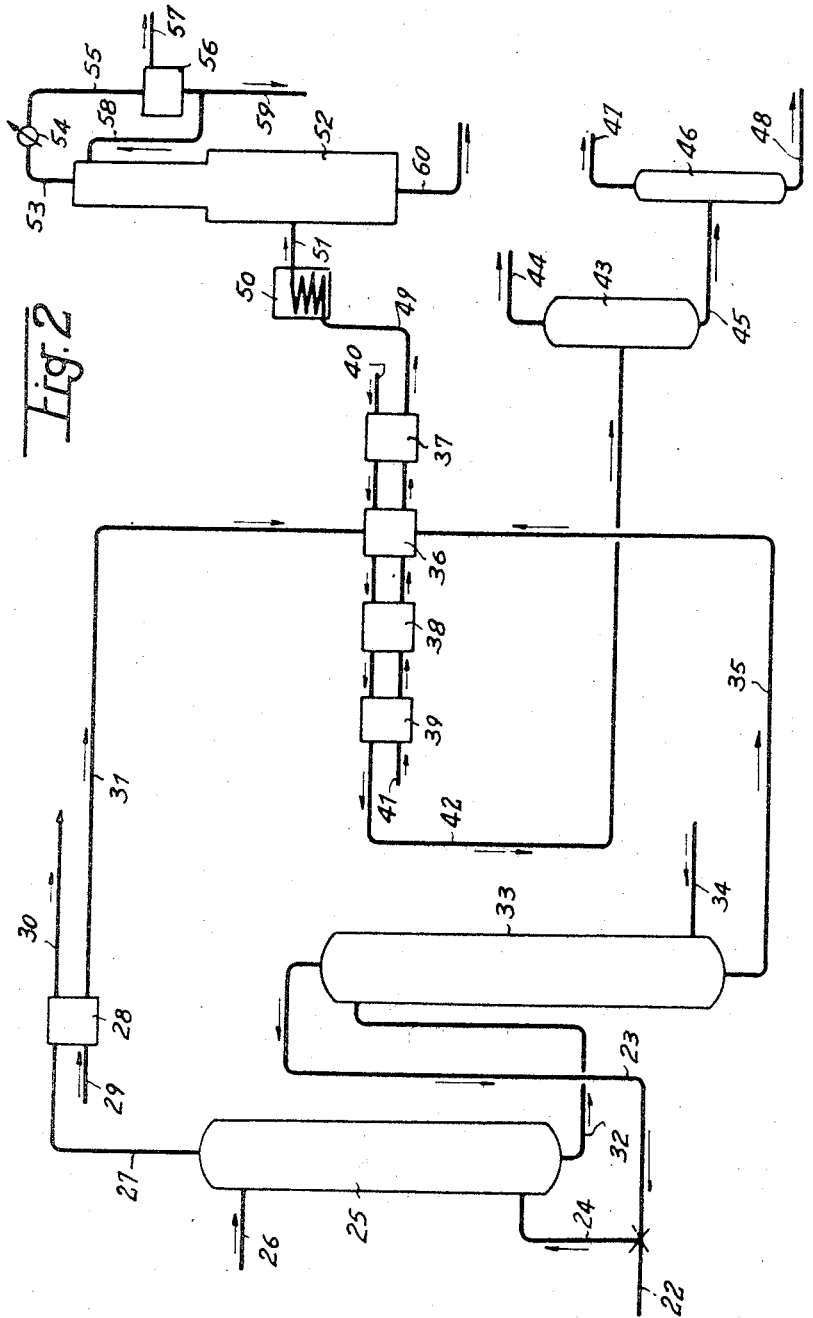

A particularly effective method of extraction of the process in accordance with the invention is illustrated in FIGURE 2 in the attached drawings.

In this preferred method of extraction, the extraction of chlorinated derivatives is effected in two separate columns, instead of the single column in FIGURE 1.

This method of extraction is characterized in that the polar solvent and the charge containing paraffinic hydrocarbons and their chlorinated derivatives are circulated in countercurrent in a first column. There is extracted from this column, at the head, a raffinate consisting of the paraffinic hydrocarbons not containing more than a small quantity of chlorinated derivatives, and at the bottom an extract which is introduced at the top of the second extraction, where it is caused to circulate in countercurrent with the non-polar solvent. From this second column there is discharged at the head an intermediate raffinate which is returned with the charge into the first extraction column and an extract consisting of the polar solvent in which the chlorinated derivatives to be extracted are dissolved. The recovery of the solvent is effected, by known means, by washing out with water and shaking up with pentane, then distilling the mixture of water and solvent, the raffinate being washed with water to recover from it the entrained solvent.

Through the line 22 (FIGURE 2) there is charged 266.5 kg. per hour of a charge of paraffinic hydrocarbons having 10 to 13 atoms of carbon per molecule, containing 34% by weight of their chlorinated derivatives. This charge is mixed with the recycled product fed through the line 23 at the rate of 266.5 kg. per hour, then the mixture is introduced through the line 24 into the extraction tower 25, consisting of fourteen perforated plates, rotating at a speed of 400 r.p.m., from whence it is placed in countercurrent with dimethyl formamide (polar solvent) introduced through the line 26 at the rate of 1,831 kg. per hour. From the tower 25, through the line 27, there is discharged 200.5 kg. per hour of raffinate containing by weight 85% paraffinic hydrocarbons, 11.2% chlorinated derivatives and 3.8% dimethyl formamide entrained. The raffinate is washed in the mixer-decanter 28 with 92 kg. per hour of water introduced through the line 29; the washed raffinate leaving through the line 30 contains no more dimethyl formamide and the paraffinic hydrocarbons containing a little of their chlorinated derivative can be returned for a chlorination operation. Through the line 31 the dimethyl formamide dissolved in the washing water is recovered.

Through the line 32 there discharges at the bottom of the tower 25 an intermediate extract which is introduced at the top of the extraction tower 33 consisting of 12 perforated plates, rotating at a speed of 350 revolutions per minute. In this tower the extract is brought into contact in countercurrent with 300.5 kg. per hour of pentane (non-polar solvent) introduced through the line 34. From the column 33 there discharges at the head a product which is recycled through the line 23 for the mixer with the mixture to be treated and the whole fed into the column 25 through the line 24 indicated above. Through the line 35 there discharges at a rate of flow of 2,198.2 kg. per hour dimethyl formamide, containing the chlorinated derivatives (3.1%) and 13.2% of pentane; this dimethyl formamide is fed into the mixer/decanter 36 with the mixture of water and dimethyl formamide resulting from the washing of the raffinate fed through the line 31.

The mixer-decanter 36 forms part of the battery of four mixer-decanters 36, 37, 38 and 39. Through the line 40 there is introduced 139 kg. per hour of pentane into the mixer 37; 115 kg. per hour of water, pentane and water circulating in countercurrent are introduced in the mixer 39 through the line 41.

Through the line 42 there discharges from the mixer-decanter 39 at the rate of 445.7 kg. per hour a diluted extract in pentane 15.4 percent by weight of chlorinated derivatives and 1.1% of paraffinic hydrocarbons. This diluted extract is fed into the flash 43 where the pentane is separated, leaving at the head through the line 44, from the rich extract leaving at the bottom through the line 45. This rich extract is fed into the distillation column 46. From this the pentane leaves at the head through the line 47 and at the bottom 73.6 kg. per hour of pure extract through the line 28. This pure extract contains 93.5% of chlorinated derivatives and 6.5% of paraffinic hydrocarbons.

Through the line 49 impoverished dimethyl formamide is discharged from the mixer-decanter 37, in solution in water with a little pentane, and this mixture is fed into the preheater 50 and then through the line 51 into the distillation column 52. From this there is discharged at the head through the line 53 a mixture of water and pentane which is condensed in the condenser 54 and fed through the line 55 into the decanter 56. There is discharged at 57 of this decanter, 67.4 kg. per hour of pure pentane and water of which a part is returned through the line 58 as a reflux into the column 52, the rest of the water discharging through the line 59 at a rate of flow of 207.1 kg. per hour. There discharges at the bottom of the column 52, through the line 60, pure dimethyl formamide, at the rate of 1,831.6 kg. per hour.

It can be seen from this example that with two columns, which increases the flexibility and control of the operation, the process in accordance with the invention makes it possible to obtain chlorinated derivatives of hydrocarbons with a purity of more than 93%, by means of solvents such as dimethyl formamide which can be 100% regenerated.

In a variant of this method of carrying out the invention, the raffinate of column 33 which contains pentane, is subjected to a vaporization in such a way as to bring the pentane content to a sufficiently low value to be without inconvenience to the treatment of the charge in the first extraction column. In the case when the polar solvent may act in the presence of a little water, this vaporization can be replaced by a stripping with water vapour.

Figure 3:
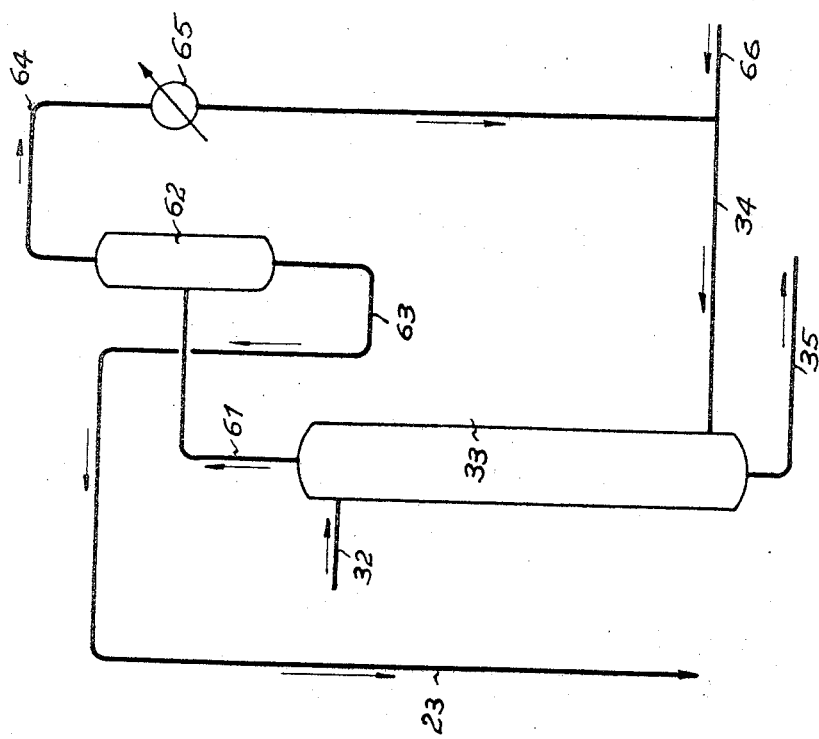

This variant is illustrated in FIGURE 3, in which the members and lines already described in connection with FIGURE 2 are given the same references.

Through the line 32 there is introduced the extract coming—as in FIGURE 2—from the first column into column 33 and, through the line 34, pentane is introduced which circulates in countercurrent with the said extract. Through the line 35 the dimethyl formamide containing the chlorinated derivatives is discharged.

Through the line 61 a raffinate discharges containing pentane. This raffinate is introduced in the vaporization column 62 from whence there is extracted through the line 63 the raffinate only containing traces of pentane which is recycled through the line 23 to be mixed with a mixture to be treated and returned to the first extraction column. Pentane discharges through the line 64 and is condensed in the condenser 65, then mixed with fresh pentane, fed through the line 66 and reintroduced through the line 34 into the column 33.

This description is merely indicative: any other method of separation of the pentane contained in the raffinate coming from the column 33 falls within the scope of the invention.

What is claimed is:

1. In a method for separating the chlorinated derivatives from a mixture of paraffinic hydrocarbons and their chlorinated derivatives containing 10 to 13 carbon atoms, the steps which comprise contacting said mixture in liquid phase at a temperaturee within the range of room temperature to 60° C. in an extraction zone with a polar solvent and a non-polar solvent, said polar solvent being selected from the group consisting of tetrahydrofurfuryl alcohol, the monomethyl ether of ethylene glycol, the monomethyl ether of diethylene glycol, acetonyl acetone, dimethyl formamide, acetonitrile, an acetone and N-methyl pyrrolidone, and said non-polar solvent being a paraffinic hydrocarbon having from 3 to 8 carbon atoms with the ratio of polar solvent to non-polar solvent being below 15, withdrawing from the top of said extraction zone a raffinate phase containing said paraffinic hydrocarbons and a portion of said non-polar solvent and being substantially free of said chlorinated derivatives of the said paraffinic hydrocarbons, and withdrawing from the bottom of said extraction zone an extract phase containing said chlorinated derivatives, said polar solvent, a substantial portion of said non-polar solvent and being substantially free of said non-chlorinated paraffinic hydrocarbons.

2. A method as described in claim 1 in which the solubility of the said polar and non-polar solvents in each other is below about 50% by weight.

3. A method as described in claim 1 in which the solubility of the said non-polar solvent in the said polar solvent is between about 5 and 20% by weight and in which the said polar solvent is substantially non-soluble in the said non-polar solvent.

4. A method as described in claim 1 in which said extraction zone is divided into two stages with the said polar solvent contacting the said mixture to be treated in a first extracting stage, contacting the extract from said first stage with the said non-polar solvent in a second stage, withdrawing a raffinate from the said second stage and combining it with the said mixture to be treated before introduction into said first stage, withdrawing an extract from the said second stage containing the said chlorinated derivatives, the said polar solvent and the said non-polar solvent, and separating the said chlorinated derivatives from the said polar and non-polar solvents.

5. A mode of performing the method as claimed in claim 4, consisting of subjecting the raffinate of the second extraction stage to a vaporization to separate the non-polar solvent, then mixing the residue of this vaporization with the mixture to be treated and recycling it to the first extraction stage, then condensing the said non-polar solvent and recycling it in the second extraction stage.

6. Method as claimed in claim 1, in which the polar solvent is anhydrous.

7. Method as claimed in claim 1, in which the polar solvent contains less than 10% water.

8. Method as claimed in claim 1, in which the polar solvent is tetrahydrofurfuryl alcohol containing 2% water.

9. A method as recited in claim 1 which includes the further steps of contacting said extract phase with water and said non-polar solvent in a second extraction zone, withdrawing a raffinate from said zone containing said chlorinated derivatives and said non-polar solvent, separating the said chlorinated derivatives from said non-polar solvent by distillation, withdrawing an extract phase from said second extraction zone containing said polar solvent and water, separating said water from said polar solvent, recycling said polar solvent to said first extraction zone, washing said raffinate from said first extraction zone with water and thereafter introducing said raffinate into a stripping zone, and separating said non-polar solvent and said non-chlorinated paraffinic hydrocarbons.

10. In a method for separating the chlorinated derivatives from a mixture of paraffinic hydrocarbons and their chlorinated derivatives containing 10 to 13 carbon atoms, the steps which comprise contacting the said mixture in liquid phase at a temperature within the range of room temperature to 60° C. in an extraction zone with a polar solvent and a non-polar solvent, said non-polar solvent being a paraffinic hydrocarbon having from 3 to 8 carbon atoms with the polar solvent being dimethyl formamide and with the ratio of polar solvent to non-polar solvent being below 15, withdrawing from the top of said extraction zone a raffinate phase containing said paraffinic hydrocarbons and a portion of said non-polar solvent and being substantially free of said chlorinated derivatives of paraffinic hydrocarbons, and withdrawing from the bottom of said extraction zone an extract phase containing said chlorinated derivatives, said polar solvent, and a substantial proportion of said non-polar solvent, and being substantially free of said non-chlorinated paraffinic hydrocarbons.

11. A method as described in claim 10 in which the solubility of the said polar and non-polar solvent in each other is below about 50% by weight.

12. A method as described in claim 10 in which the solubility of the said non-polar solvent in the said polar solvent is between about 5 and 20% by weight and in which the polar solvent is substantially non-soluble in the said polar solvent.

13. A method as described in claim 10 in which the said polar solvent is anhydrous.

14. A method as described in claim 10 in which the said polar solvent contains less than 10% water.

15. A method as described in claim 10 in which said temperature is the ambient temperature.

References Cited

UNITED STATES PATENTS

| | | | |
|---|---|---|---|
| 2,189,924 | 2/1940 | Pier et al. | 260—660 |
| 2,223,364 | 12/1940 | Flett | 260—660 |
| 2,357,028 | 8/1944 | Shiras et al. | |
| 2,503,119 | 4/1950 | McKinnis | 260—658 |
| 2,531,361 | 11/1950 | Padgitt | 260—658 XR |
| 3,277,204 | 10/1966 | Feestandig et al. | 260—660 XR |
| 3,251,872 | 5/1966 | Kanpp et al. | 260—660 XR |

FOREIGN PATENTS

| | | |
|---|---|---|
| 355,294 | 8/1931 | Great Britain. |
| 477,567 | 1/1938 | Great Britain. |

OTHER REFERENCES

Weissberger, Technique of Organic Chemistry, vol. III, Part I (1956), pp. 360–364, QD. 251 W44.

LEON ZITVER, *Primary Examiner.*

H. MARS, *Assistant Examiner.*

U.S. Cl X.R.

210—21, 22